March 9, 1926.  
J. F. GANSKI  
DOUGHNUT MACHINE  
Filed Feb. 5, 1925
1,576,270
3 Sheets-Sheet 3
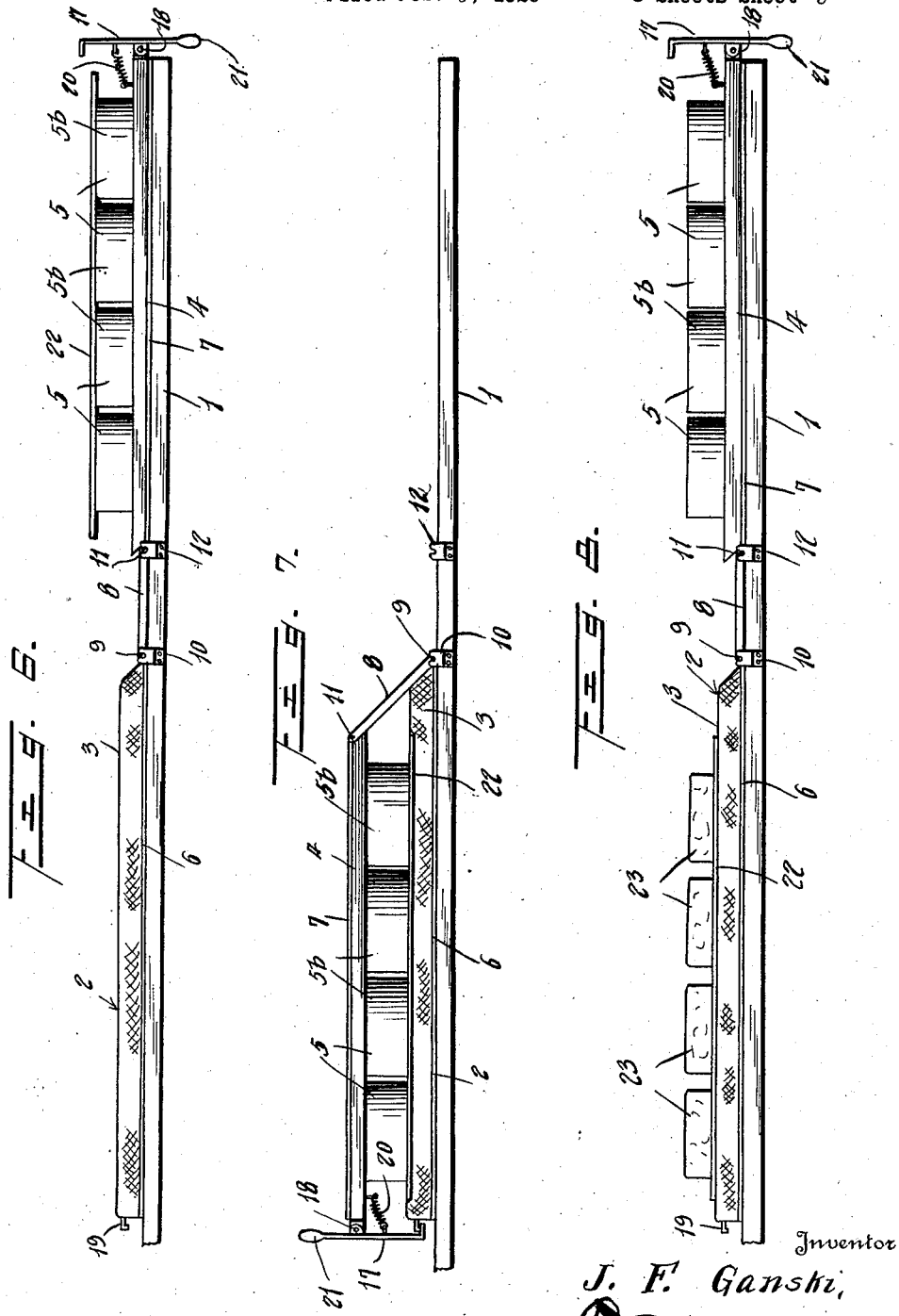
Inventor  
J. F. Ganski,  
Attorney Patented Mar. 9, 1926.

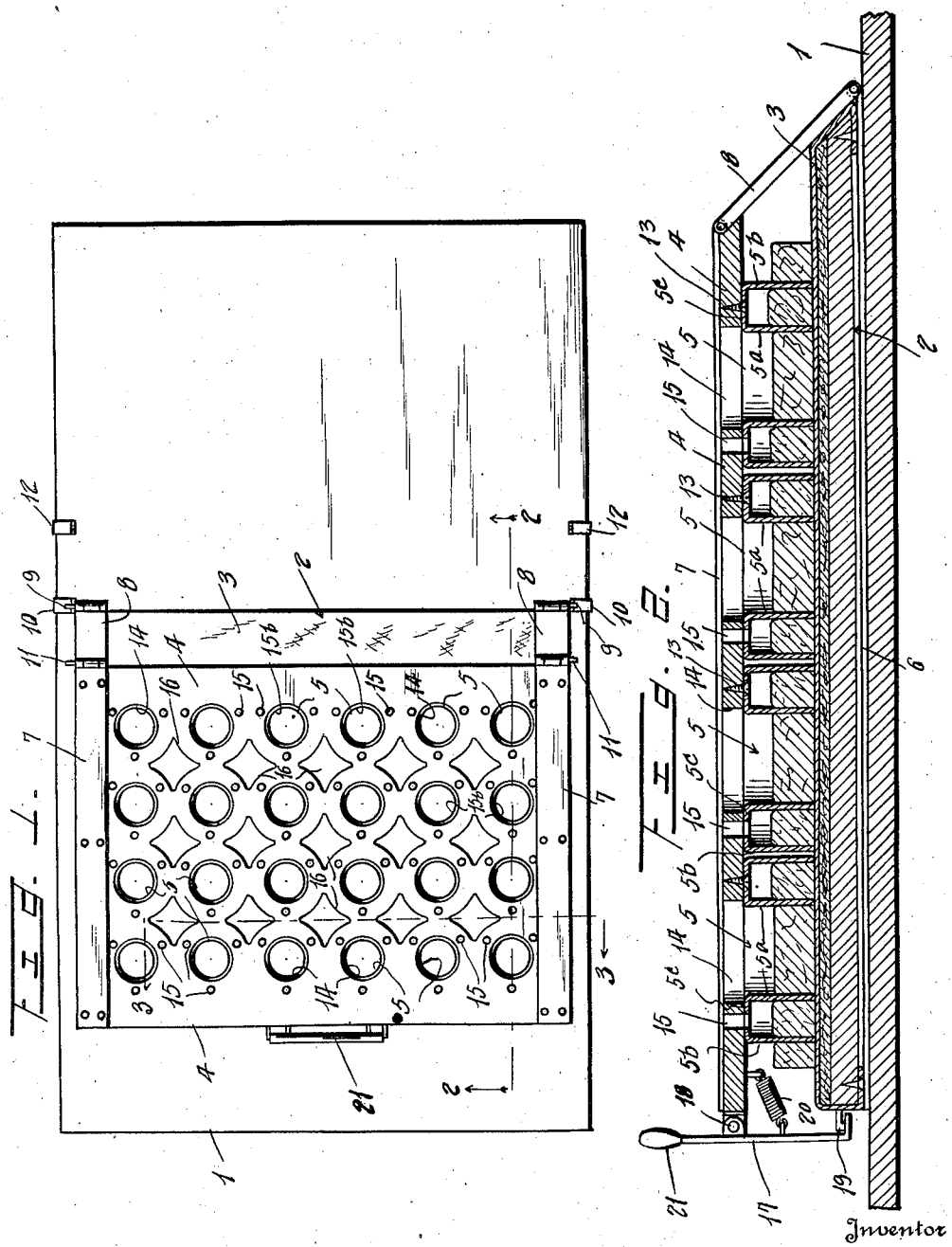

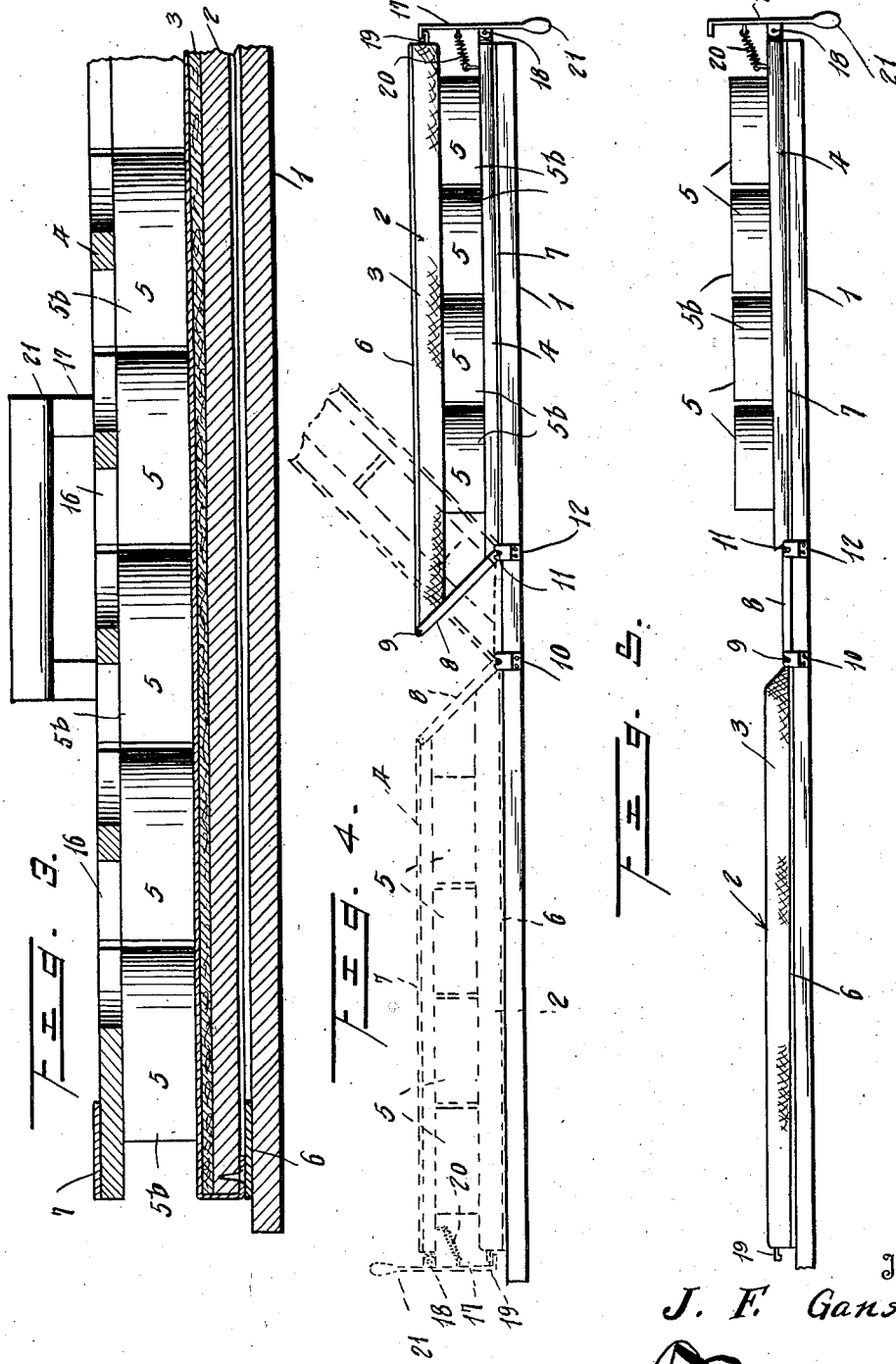

1,576,270

UNITED STATES PATENT OFFICE.

JOSEPH F. GANSKI, OF PORTLAND, MAINE.

DOUGHNUT MACHINE.

Application filed February 5, 1925. Serial No. 7,120.

*To all whom it may concern:*

Be it known that I, JOSEPH F. GANSKI, a citizen of the United States, residing at Portland, in the county of Cumberland and State of Maine, have invented certain new and useful Improvements in Doughnut Machines; and I do hereby declare the following to be a full, clear, and exact description of the invention, such as will enable others skilled in the art to which it appertains to make and use the same.

The present invention relates to an appliance whereby to facilitate the preparation of doughnuts and analogous cakes for cooking, and provides a machine embodying a doughboard, a cutter, and a pan, the several parts being so related as to admit of one person performing substantially the same amount of work in a given time which under the present practice requires a number of individuals to effect thereby saving time and materially reducing the cost of production.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification—

Figure 1 is a top plan view of a doughnut machine constructed in accordance with my invention, Figure 2 is a transverse sectional view taken on the plane indicated by the line 2—2 of Figure 1, Figure 3 is a longitudinal sectional view taken on the plane indicated by the line 3—3 of Figure 1, Figure 4 is a side elevational view of the machine reversed on the bench, Figure 5 is a side elevational view with the doughboard in normal position and the back and cutters in opened position, Figure 6 is a view similar to Figure 5 with the doughnut receiving pan positioned upon the cutters, Figure 7 is an side elevational view with the doughboard, cutters and back in normal position and the pan positioned between the cutters and doughboard to receive the doughnuts from the cutters, and Figure 8 is a side elevational view with the back and cutters swung into opened position to deposit the doughnuts upon the pan.

Corresponding and like parts are referred to in the following description, and designated in the several views of the drawings, by similar reference characters.

In the drawings 1 designates a bench or like support upon which the doughnut machine is mounted. The machine comprises a doughboard 2 which is preferably padded or covered as indicated at 3, a back 4 which is of considerable weight, and cutters 5 which are secured to the back. The back 4 is connected to the doughboard 2 by hinges which comprise terminal straps 6 and 7 and intermediate straps 8. The straps 6 are secured to the under side of the doughboard 2 and the straps 7 to the upper side of the back 4, and the straps 8 are located at the inner side edges of the doughboard and back. The pintles 9 of the hinges extend outwardly beyond the end edges of the doughboard 2 and are positioned in open bearings 10 secured to the bench 1 whereby to hingedly connect the machine to the bench. The pintles 11 of the hinges extend outwardly beyond the end edges of the back 4 and are adapted when the back is in opened position to occupy open bearings 12 secured to the bench 1 in spaced relation to the bearings 10 whereby to establish a hinged connection between the back 4 and the bench 1 when the former is in opened position. The cutters 5 are of circular outline and each comprises inner and outer rings $5^a$ and $5^b$, respectively, connected at their upper ends by an annular strip $5^c$. Elements 13 passing through the strip $5^c$ and engaging the back 4 secure the cutters in place. The back 4 is provided with openings 14 which register with the inner openings of the cutters 5 so as to permit the waste dough to be discharged from the cutters when the back 4, cutters 5 and doughboard 2 are moved into the upwardly inclined position indicated by dotted lines in Figure 4. To permit the escape of air from the cutters 5 while they are being forced through the dough, the back 4 and plates $5^c$ are provided with registering openings 15, and to permit the waste dough between the cutters to be discharged from the machine when the latter is in said upwardly inclined position the back 4 is provided with openings 16. The back 4 is adapted to be secured in closed position over the doughboard 2 by means of a latch 17 which is pivoted at 18 to the free or outer side edge of the back 4 and which is adapted to engage a keeper 19 secured to the free or outer side edge of the doughboard 2. The latch 17 is yieldingly held in engagement with the keeper 19 by a coil spring 20 and is provided with a grip bar 21.

The operation of the machine may be stated to be as follows: After the back 4 and cutters 5 are swung into opened position as illustrated in Figure 5, a batch of dough is placed upon the board 2 and rolled to the desired or required thickness. The back 4 and cutters 5 are then swung into closed position over the doughboard 2, as shown in Figure 2, the weight of the back 4 carrying the cutters 5 through the dough and the latch 17 automatically engaging the keeper 19. The handle 21 is then grasped and the machine swung upon the pintles 9 into the inclined position illustrated by dotted lines in Figure 4, and is held in this position until the waste dough has discharged through the openings 14 and 16 in the back 4. When the machine is in this position the pintles 11 are in the bearings 12, and after the waste dough has been discharged and removed from the machine and removed from the bench 1, the machine is rocked upon the pintles 11 until the back 4 rests upon the bench 1, as shown in Figure 4. The latch 17 is then swung to release the doughboard 2 and the latter is returned to its normal position upon the bench 1 after which the pan 22 is placed upon the cutters 5, as shown in Figure 6. The back 4, cutters 5 and pan 22 are swung back into closed position upon the doughboard 2, as shown in Figure 4. The back 4 is thence again swung into opened position, leaving the pan 22 upon the doughboard 2 and the doughnuts 23 upon the pan. The pan may now be removed from the doughboard to admit of the doughnuts being cooked.

What is claimed is:—

1. A doughnut machine comprising a support, a padded doughboard, means mounting the latter for swinging movement relatively to the support, a multiple cutter hinged to the doughboard and comprising a back and a plurality of cutters, each of the cutters comprising spaced inner and outer elements, and said back having openings opposite the spaces between the several cutters and opposite the spaces of the inner elements of each of the cutters.

2. A doughnut machine comprising a support, a relatively movable doughboard and cutter back, means hinging said doughboard and cutter back to the support to adapt it for movement to a position at an angle to the support, and bearings engageable by the latter means in the angular position for the purpose specified.

3. A doughnut machine comprising a support, a doughboard disposed thereon, a cutter back associated with the doughboard and disposed thereon, and angularly disposed means hinging the doughboard to the support and the doughboard and back together, for the purpose specified.

4. A doughnut machine comprising a support, a doughboard disposed thereon, a cutter back associated with the doughboard and disposed thereon, and angularly disposed means hinging the doughboard to the support and the doughboard and back together, for the purpose specified, said means having laterally extended pintles at the back, and bearing means on the support engageable by the pintles in the angular position for the purpose specified.

In testimony whereof I affix my signature.

JOSEPH F. GANSKI.